Oct. 10, 1967
L. R. ANDERSON
3,345,679
NON-LOOSENING HINGE
Filed Oct. 24, 1965
4 Sheets-Sheet 1
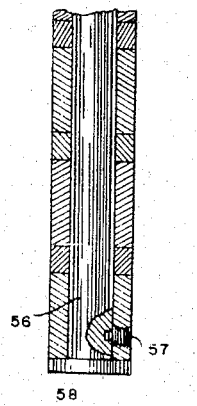
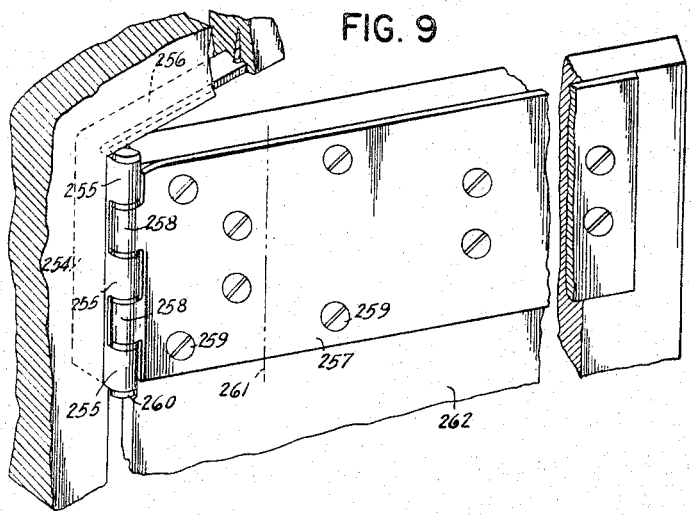
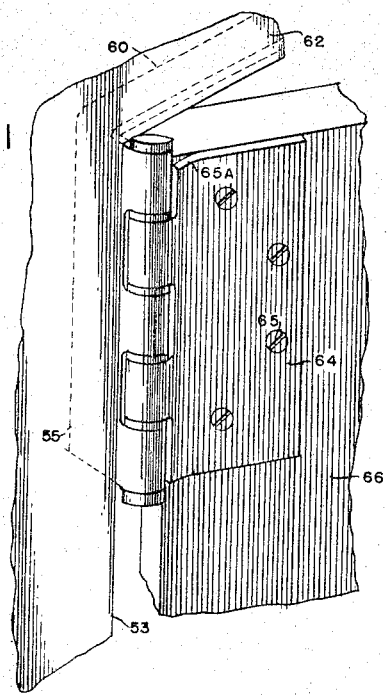
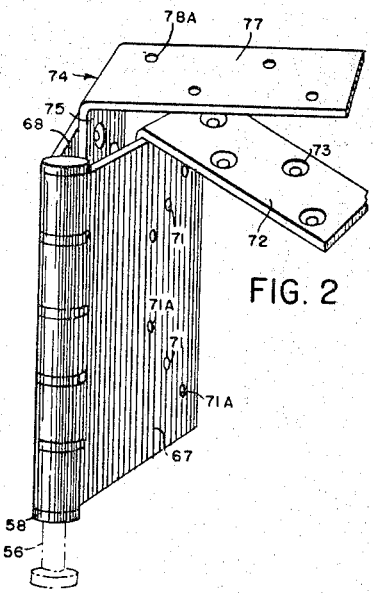
INVENTOR.
BY Lloyd R. Anderson
Milford A. Juten

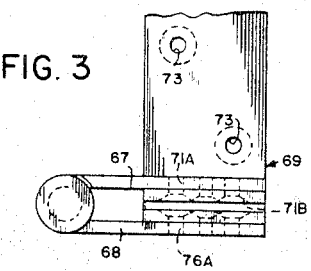
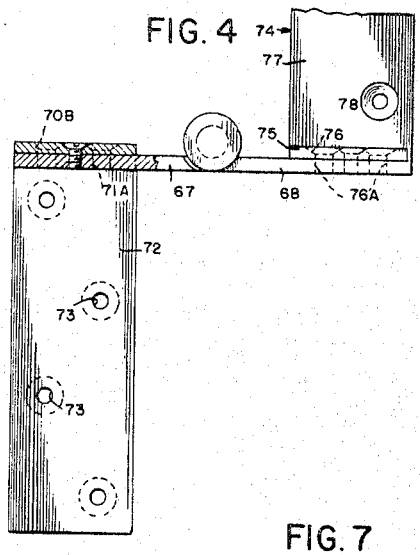
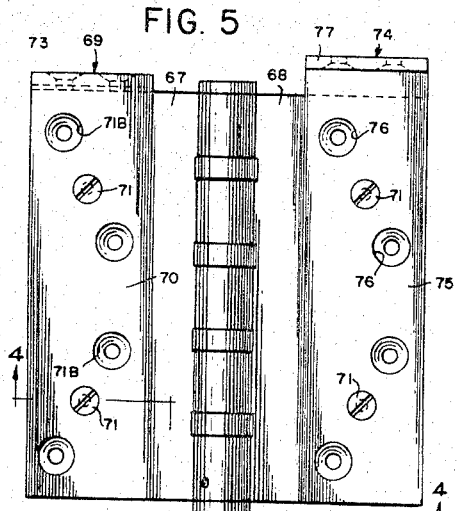
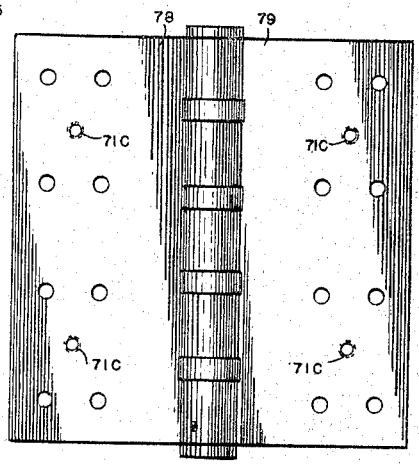
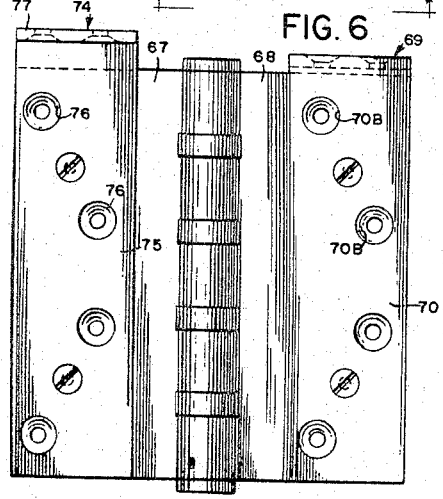

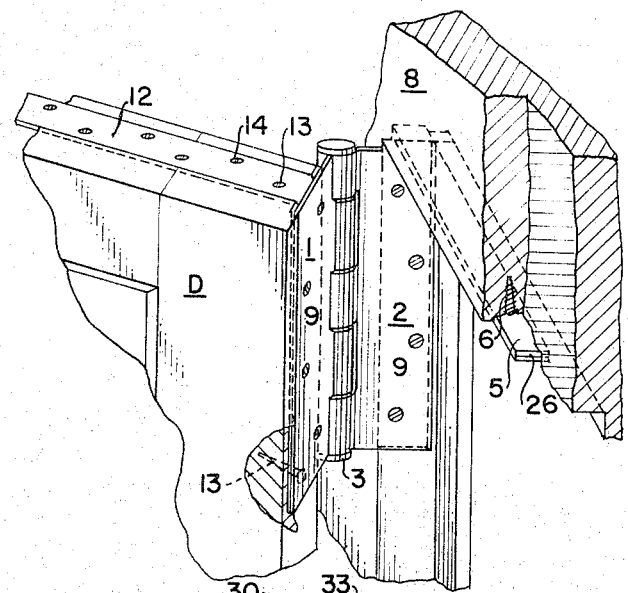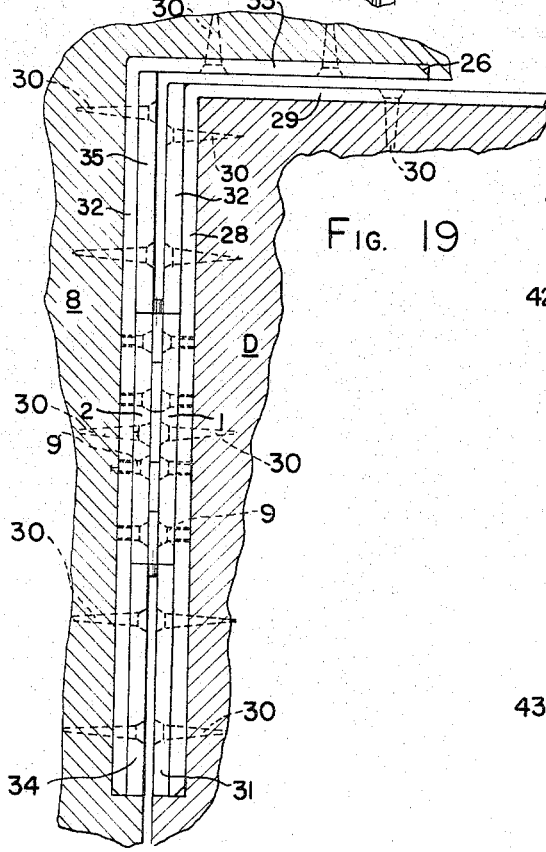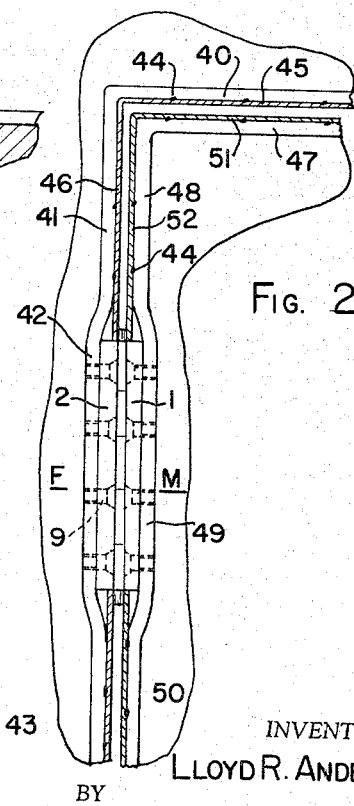

Oct. 10, 1967   L. R. ANDERSON   3,345,679
NON-LOOSENING HINGE
Filed Oct. 24, 1965   4 Sheets-Sheet 4
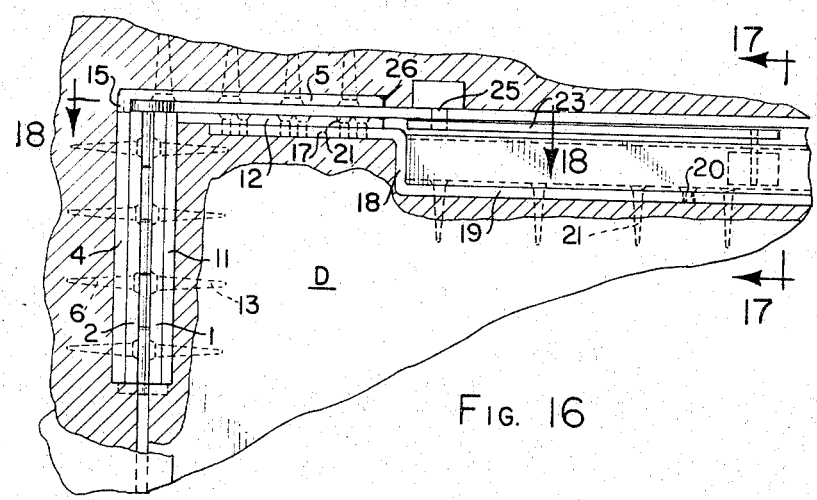
Fig. 16
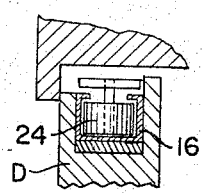
Fig. 17
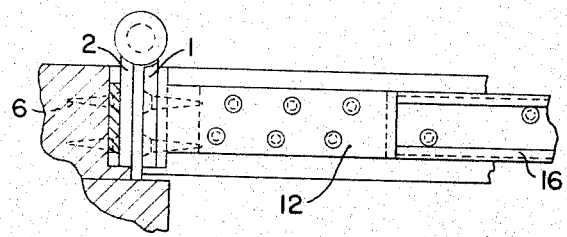
Fig. 18
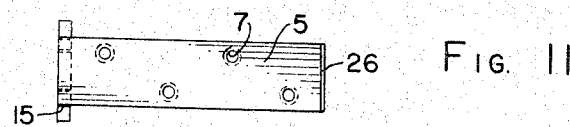
Fig. 11
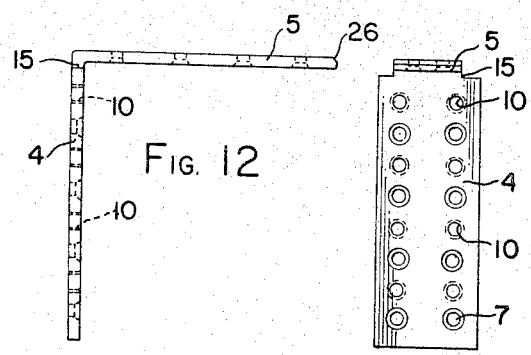
Fig. 12   Fig. 13
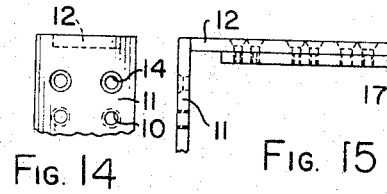
Fig. 14   Fig. 15
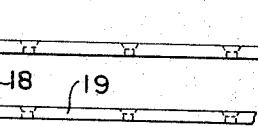
INVENTOR.
LLOYD R. ANDERSON
BY Milford A. Juten

UNITED STATES PATENT OFFICE 3,345,679
Patented Oct. 10, 1967

3,345,679
NON-LOOSENING HINGE
Lloyd Robert Anderson, 5400 Pooks Hill Road,
Bethesda, Md. 20014
Filed Oct. 24, 1965, Ser. No. 521,226
22 Claims. (Cl. 16—128)

The present application is a continuation-in-part of applications Ser. No. 193,641, filed Feb. 14, 1962, now Patent 3,235,903 issued Feb. 22, 1966 which was a division of application Ser. No. 687,130, filed Sept. 30, 1957, now Patent 3,021,554, issued Feb. 20, 1962, and application Ser. No. 763,962, filed Sept. 29, 1958, now Patent 3,082,474, issued Mar. 26, 1963.

The present invention relates to building hardware and more particularly to a hinge construction of general utility such as used on doors as shown in U.S. Patent 2,853,747.

Although hinges have been used for many years and with all types of door closers, door stops, and door holders, hinges heretofore used have not been entirely satisfactory because the attaching screws have come loose, particularly the attaching screws for the jamb leaf of the top hinge. The screws for the top hinge of doors repeatedly come loose due to the tension on the screws caused by the weight of the door as well as the reaction produced by the door stops, door holders, or door closers.

In doors equipped with a door stop or door holder reacting against the top edge of the door close to the top hinge for preventing the door from opening too far, additional strain is produced on the screws securing the jamb leaf of the top hinge to the hinge jamb of the door frame. The repeated stress and strain cause the screws to pull out resulting in sagging doors requiring much expensive maintenance to keep the door operative.

An object of the present invention is to provide a hinge structure which will overcome the problem of screws becoming loose.

A further object is to provide a hinge structure which reinforces the top edge of a door and the door frame.

Another object is to provide a hinge structure which will distribute the stress and strain sufficiently to limit the stress to sufficiently small loads on each fastening element that the fastening elements will remain secure without attention.

Another object is to provide a structure which will always have some of the fastening elements in shear stress thereby reducing the tensile stress on the fastening elements.

Still another object is to provide hinge structure which receives a large part of its support from mortised mountings in the door jamb and door.

A further object of the invention is to provide attachments for conventional hinges which will provide anchoring for the jamb leaf to the jamb and lintel of a door frame and/or the door.

A further object is to provide means to positively retain the jamb leaf of the top hinge of a door against the pulling out of the fastening screws.

Another object is to provide a reinforcing and non-loosening hinge set which may be easily changed for right or left hand use.

Another object is to provide hinge structure which may be mounted in mortise recesses or on the surface.

Other and further objects will become apparent as the description proceeds and upon reference to the accompanying drawing wherein:

FIGURE 1 is a fragmentary perspective of one modification of a hinge of the present invention with a surface mount door leaf.

FIGURE 2 is a perspective of a modification showing an unswaged butt hinge with dihedral angle brackets secured to the hinge leaves resulting in a non-loosening hinge structure with minimum manufacturing costs and inventories.

FIGURE 3 is a bottom view of the hinge of FIGURE 2 in close position.

FIGURE 4 is a partly sectional bottom view of the hinge of FIGURE 2 in open condition, taken substantially on line 4—4 of FIGURE 5.

FIGURE 5 is an elevation of the hinge of FIGURE 2 in open condition as seen from the exposed side when mounted on a door.

FIGURE 6 is a view similar to FIGURE 5 of the same hinge and dihedral brackets assembled to form an opposite handed hinge.

FIGURE 7 is an elevational view of an unswaged hinge for use with either right or left hand hinging which may be used with dihedral angle brackets without regard to handing.

FIGURE 8 is a detail sectional view on an enlarged scale through the hinge knuckles to show the screw for securing the hinge pin in position.

FIGURE 9 is a perspective with parts broken away of multiple knuckle non-loosening hinge with an outside surface mounted door hinge leaf plate mounted on the outer surface of a door and extending substantially the entire width of the door and a single mortise mount of the hinge jamb plates of the dihedral angle jamb hinge leaf in the frame.

FIGURE 10 is a perspective of an open door mounted on conventional butt hinges secured to dihedral angle brackets in the frame and on the door.

FIGURES 11, 12 and 13 are plan view, elevation, and end view, respectively, of the jamb dihedral angle bracket of FIGURE 10.

FIGURE 14 is a sectional view taken substantially on line 14—14 of FIGURE 15 showing the inner surface of the door dihedral angle bracket and showing a section of the top strap thereof.

FIGURE 15 is a fragmentary view of a modified door dihedral angle bracket with a Z-shaped bracket for mounting a door holder and door stop showing the strap of the door dihedral angle bracket of indefinite length for strengthening the upper portion of a door and distributing the hinge load over a substantial width of the door.

FIGURE 16 is a fragmentary section through a door and door frame taken substantially along the free edges of the butt hinge leaves and showing how the door dihedral angle bracket is secured to the Z-shaped bracket for mounting the channel of the door holder door stop.

FIGURE 17 is a section taken on lines 17—17 of FIGURE 16.

FIGURE 18 is a fragmentary section on line 18—18 of FIGURE 16 showing the top edge of the door and the cooperative relation of the door holder and door stop with the connecting link reacting between the door frame and the door.

FIGURE 19 is a fragmentary section similar to FIGURE 16 showing a conventional butt hinge supported approximately 5 inches from the top edge of the door using dihedral angle brackets and filler plates.

FIGURE 20 is a fragmentary section taken along the free edges of a conventional butt hinge mounted in a metal door and a metal frame with dihedral angle brackets.

The non-loosening hinge shown in FIGURE 1 includes the jamb leaf 55 and its retaining strap 60 mounted in the jamb 53 and lintel 62, respectively, by screws (not shown) in a manner similar to that shown in FIGURE 10, but the door hinge leaf 64 is of the surface mounted type being held in position by oval head screws 65 on the front surface of the door 66. The jamb leaf 55 is a conventional swaged leaf and the door hinge leaf has a gradual bend at 65A to avoid weakening the leaf.

In FIGURES 2 to 5 a modified form of non-loosening hinge has been provided from a butt hinge having unswaged leaves 67 and 68 leaving an appreciable space between the leaves when the hinge is in closed position as shown in FIGURE 3. A first or door dihedral angle bracket 69 has one leg 70 in face-to-face abutting relation with the inner surface of the hinge door leaf 67 and is fixedly secured thereto by means of screws 71 passing through countersunk apertures in the leg 70 and threaded into registering tapped holes in door leaf 67. Screw receiving holes 71A are provided in the door leaf 67 and register with countersunk holes 71B in the leg 70 of the door angle bracket 69. The other leg 72 of the door dihedral angle bracket is adapted to have screws pass through countersunk holes 73 therein for fastening the door bracket to the top edge of a door.

A jamb dihedral bracket 74 having a leg 75 in abutting face-to-face relation with the jamb leaf 68 of the hinge is secured thereto by means of screws 71 which pass through countersunk holes in the leg 75 and threaded into tapped holes in jamb leaf 68, other countersunk holes 76 being provided in leg 75 for jamb leaf attaching screws, the jamb leaf 68 having registering apertures 76A. The other leg 77 of jamb bracket 74 is provided with countersunk holes 77A for securement to the lintel of a door frame.

The modification of FIGURE 6 has the door dihedral bracket 69 and the jamb dihedral bracket 74 interchanged on the hinge leaves so as to be mounted on hinge leaves 68 and 67, respectively, thereby making an opposite handed hinge combination for application to a door opening in the opposite direction. This interchange may be accomplished without requiring any additional parts. The holes in the one hinge leaf 67 are arranged as shown with relation to the holes in the leaf 68 and therefore the dihedral angle brackets may be interchanged merely by removing the attaching screws 71 and changing the dihedral brackets from the position shown in FIGURES 2 to 5 to the position shown in FIGURE 6. By this interchange it will be noted that the three knuckle part of the hinge is then to be secured to the door instead of to the jamb.

It will be noted that screw receiving holes in leaf 67, leaf 68, leg 75 and leg 70 are arranged in the same pattern in which lines connecting the centers of the corresponding holes are parallel as viewed when the hinge is in open position and thus permits the interchange to accommodate for left and right hand opening doors.

A further modification which will permit interchange of the mounting of the hinge for left hand or right hand operation is shown in FIGURE 7 where each hinge leaf 78 and 79 has eight mounting holes which will register with the holes of the hinge leg of either dihedral bracket and the unused holes of the hinge will be covered by the hinge leg of the dihedral bracket. The machine screws 71 threaded into tapped holes 71C will maintain the dihedral brackets in position and the screws for attaching the hinge leaves will pass through the adjacent leg of the dihedral bracket and the hinge thereby additionally maintaining the dihedral brackets in fixed position with relation to its associated hinge leaf.

The hinge of the forms shown in FIGURES 2 to 8, inclusive, provides for a kit including a door dihedral bracket, a door frame dihedral bracket and an unswaged hinge whereby the kit may be assembled to accommodate for mounting on a door opening in either direction. It will be noted that the holes in the hinge formed of leaves 67 or 68 do not need to have countersunk holes and that the door dihedral bracket 69 has its holes countersunk on the exterior surfaces while the door frame dihedral bracket 74 has its holes countersunk on the interior surfaces of the bracket.

Upon reference to FIGURE 9 the jamb leaf includes a hinge jamb plate 254 having multiple knuckles 255 and a head jamb plate 256 secured thereto and forming a dihedral hinge leaf which is motise mounted in the door frame. The door leaf includes a surface mounted plate or strip 257 having multiple knuckles 258 which strip or plate is secured to the outer surface of the door by means of screws 259, this construction providing for simplification of mounting the door hinge leaf on the door. The pivot pin 260 is removably mounted in the knuckles so as to be removable from the bottom being held in position by a set screw as shown in FIGURE 8. The plate or strip 257 may stop at the dot dash line 261 similar to FIGURE 1 or may continue to the lock edge of the door 262 to reinforce the door throughout its width and distribute the stress of the hinge.

Referring to FIGURES 10 to 18, inclusive, a conventional swaged butt hinge having leaves 1 and 2 pivotally connected together by the usual hinge pin 3 which is removable from the bottom in a manner similar to that shown in FIGURE 8 and is held in place by a set screw. A jamb dihedral angle bracket including a hinge jamb plate 4 and a lintel strap 5 is secured to the hinge jamb and lintel by suitable screws 6 passing through countersunk screw receiving apertures 7 into the jamb and lintel, thereby securely retaining the jamb dihedral angle bracket 4, 5 in fixed position in communicating mortises in the hinge jamb and lintel of the door frame 8. The jamb leaf 2 is secured to the plate 4 by machine screws 9 passing through the usual countersunk screw receiving apertures in the conventional butt hinge and being threaded into the cooperating tapped screw receiving apertures 10 in the jamb plate 4, thereby making an integral unit of the hinge leaf 2 and the jamb dihedral angle bracket 4, 5. The resulting structure performs an equivalent function to applicant's prior patents and applications.

A door dihedral angle bracket includes a heel plate 11 and a top strap 12 which are secured by suitable screws 13 passing through countersunk apertures 14 in the heel plate 11 and the top door strap 12, it being noted that the door dihedral angle bracket has the countersunk portions of the screw receiving apertures on the outer surfaces of the plate and strap, while the countersunk portions of the screw receiving apertures in the jamb dihedral bracket are on the inner surfaces of the jamb plate and lintel strap. The door leaf 1 is secured to the heel plate 11 by suitable machine screws 9 passing through the usual countersunk screw receiving apertures of the hinge leaf and threadedly received in the screw threaded apertures 10 in the heel plate 11.

The jamb dihedral angle bracket and the jamb leaf 2 are mounted in communicating mortises in the hinge jamb and the lintel so the surface of the butt hinge is substantially flush with the edge of the door jamb. The lintel strap 5 is appreciably narrower than the jamb plate 4 to permit the reverse mounting of the dihedral angle bracket for a right hand opening door as shown in FIGURE 10 and a left hand opening door as shown in FIGURES 16 to 18, inclusive.

The plate 4 and the plate 11 are the same size as the portions of the hinge leaves received in the mortise recesses and the straps 5 and 12 are appreciably narrower with the tops of the plates being substantially flush with the tops of the corresponding hinge leaves. Consequently, there is a neck portion 15 in the jamb dihedral angle bracket of substantially the same width as the lintel strap 5. The hinge mounted on the dihedral angle brackets as shown in FIGURES 10 to 18, inclusive, is adapted to cooperate with a door control device such as a door holder, door stop and/or a door closer having a channel 16 received in a mortise in the top edge of the door and such channel is supported by a Z-shaped bracket which includes a strap 17 connected to a strut 18 which in turn is connected to another strap 19 on which the channel is mounted by suitable means such as screws which may pass through the web of the channel and also through the strap 19. The channel 16 may be secured to the strap 19 by means of machine screws 20 passing through countersunk apertures in the web of the channel and threaded into screw-threaded apertures in the strap 19 or a combination of both wood screws 21 and machine screws 20 may be used, thereby effectively securing the channel 16 to the door D. The Z-shaped bracket 17, 18, 19 is received in a mortise in the door D and the strap portion portion 17 thereof is secured to the strap 12 of the door dihedral angle bracket by suitable machine screws 21 threaded into threaded apertures in the strap portion 17. The strap 17 portion and the strap 12 may additionally be secured together and to the door D by screws passing through aligned apertures in the straps and screwed into the door D. In FIGURE 15 the strap 12 of the door dihedral angle bracket 11, 12 is shown of intermediate length similar to that of FIGURE 10 and it will be noted in FIGURE 15 that such strap overlies the Z-shaped bracket 17, 18, 19 making the door dihedral angle bracket suitable for all types of doors. When the door holder is to be mounted, the strap 12 is cut off to terminate adjacent the strut as shown in FIGURE 16, thereby providing clearance for the door holder including the channel 16, the link 23 and the slide 24, which cooperate with the pivot 25 fixed to the lintel of the door frame to control the opening of the door in a manner well understood in the door stop and door holder art.

The lintel strap 5 of the jam dihedral angle bracket is chamfered at 26 adjacent its free end to provide for ready assembly without having an excessively large mortise.

In FIGURE 19 a section of a wooden door D is hinged in the frame 8 by the hinge leaves 1 and 2 which are supported on a door dihedral angle bracket including a heel plate 28 and a top door strap 29 secured to the door by screws 30 in a manner similar to that previously described. The door hinge leaf 1 is secured by screws 9 passing through the countersunk apertures in the hinge leaf and threaded into threaded apertures in the dihedral angle plate 28. The plate 28 extends beyond the lower end of the hinge and also extends above the upper end of the hinge with the hinge being shown approximately 5 inches from the top of the door to position the hinge in the usual location for the top hinge. The hinge leaf 1 and the plate 28 are received in a mortise which communicates with the mortise in the top edge of the door receiving the strap 29. To provide a neat flush appearance, filler plates 31 and 32 are mounted on the door plate 28 by means of welding or other suitable means and at least some of the screws 30 pass through the plates 31 and 32 and through aligned apertures in the plate 28 itno the door D to additionally secure the bracket and hinge leaf to the door.

The other leaf 2 of the hinge is secured to the jamb dihedral angle bracket which includes a hinge jamb plate 32 and a lintel strap 33 and such dihedral angle bracket is secured to the hinge jamb and the lintel by screws 30 in a manner similar to that previously described. The hinge leaf 2 is secured by machine screws 9 passing through the usual screw receiving apertures in the hinge leaf and threaded into the aligned threaded aperture in he plate 32 with the threaded apertures and screw receiving apertures being arranged in a manner shown in FIGURES 11, 12 and 13, as previously described. The plate 32 and the hinge leaf 2 are mounted in a mortise so the exposed surface of the hinge leaf is substantially flush with the hinge jamb of the frame and filler plates 34 and 35 are provided to fill the space at the ends of the jamb hinge leaf 2 to provide a smooth flush appearance.

Referring to FIGURE 20, a hollow metal door M is mounted in a hollow metal door frame F by means of conventional butt hinges having leaves 1 and 2 mounted by means of machine screws 9 passing through the countersunk apertures in the hinge leaves and threaded into the hinge seats of the jamb dihedral angle bracket and the door dihedral angle bracket. The jamb dihedral angle bracket includes a strap 40, a plate portion 41, an offset hinge seat 42 and a bottom plate portion 43, secured by spot-welding 44 to the inner surface of the lintel 45 and the inner surface of the hinge jamb 46 of the sheet metal skin of the frame. Similarly, a dihedral angle bracket including a strap 47, a plate portion 48, a hinge receiving offset seat 49, and a bottom portion 50 is welded to the inner surface of the top metal 51 and to the heel metal 52 of the metal skin of the door M by spot-welding 44. The skin metal of the heel edge of the door 52 and of the adjacent surface of the hinge jamb 46 of the frame extend in edge-to-edge relation with the ends of the hinge leaves 1 and 2 providing a flush surface along the heel edges of the door and along the hinge jamb. The hinge leaves 1 and 2 are securely mounted by means of the machine screws 9 permanently retained in fixed position since the dihedral angle brackets remain in fixed positions on the door and on the frame and such dihedral angle brackets serve to reinforce the door and frame also prevent any relative motion between the door and the hinge whereby the butt hinge remains in permanent fixed relation with respect to the frame F and the door M.

The arrangement of screw threaded apertures in the hinge seats 42 and 49 are substantially the same as that shown in FIGURES 12 and 13 to assure that the dihedral angle bracket may be used on opposite handed doors. The straps 40 and 47 are centered with respect to the plates 41 and 48 and may be of the same width since the metal skin of the door frame and of the door lie substantially in the same plane and there is no need for the reveal covering the edge of the lintel or the door strap since the straps are completely hidden by being on the inside of the hollow door and hollow frame.

When the straps are narrow as shown in the wood doors a relish left on the outside of the mortise covers the edge of the straps as shown in FIGURE 10.

It will therefore be apparent that the present invention provides for permanent non-loosening of conventional hinges in metal and wood doors and provides for reinforcement of such doors and frames.

Changes may be made within the spirit of the invention as defined by the valid scope of the claims.

What is claimed is:

1. Non-loosening hinge construction comprising a hinge having a jamb leaf and a door leaf pivotally connected together, said jamb leaf and said door leaf being of the same length along the pivotal axis, a dihedral angle bracket for attachment to the hinge jamb and lintel of a door frame and having a hinge jamb plate of a length greater than the length of the jamb leaf by at least the clearance between the door and lintel for attachment of the hinge jamb to a door frame, said bracket having a lintel strap adapted to be attached to the lintel of a door frame, means to secure the dihedral angle bracket to the hinge jamb and to the lintel, means to secure the jamb leaf to the jamb plate of the dihedral angle bracket, and means to secure the door leaf to a door.

2. The invention according to claim 1 in which the means to secure the jamb leaf to the jamb plate provides for securing the jamb leaf with the pivot at either edge of the jamb plate.

3. The invention according to claim 1 in which the jamb leaf is on the inner surface of the jamb plate.

4. The invention according to claim 1 in which the jamb leaf is on the outer surface of the jamb plate.

5. The invention according to claim 1 in which a second dihedral angle bracket is provided for attachment to a door with a plate for attachment to the hinge edge of a door and with a strap for attachment to the top edge of a door, means to secure the plate of the second dihedral angle bracket to the door leaf, and means to secure the second dihedral angle bracket to the hinge edge and the top of a door.

6. The invention according to claim 1 in which the door and jamb leaf of the hinge are spaced from the lintel strap a distance substantially greater than the clearance between the top edge of a door and the lintel.

7. The invention according to claim 1 in which the hinge is mounted on a hollow metal door frame and the angle bracket is mounted on the inner surface of the hollow metal door frame.

8. The invention according to claim 5 in which the jamb hinge leaf is mounted on a hollow metal door frame with the jamb dihedral angle bracket fixed to the inner surface of the hollow metal door frame and the door hinge leaf is mounted on a hollow metal door with the door dihedral angle bracket mounted on the inner surface of the hollow metal door.

9. A sheet metal door and frame structure comprising a hinge having a jamb leaf and a door leaf including a jamb plate and a door plate pivotally connected together, lintel strap fixed to said jamb plate forming a dihedral angle therewith for attachment to the lintel of the door frame, said door leaf including a top strap forming a dihedral angle with the door plate for attachment to the top of a door, said jamb leaf being mounted on the inner surface of a hollow metal door frame and said door leaf being mounted on the inner surface of a hollow metal door.

10. A Z-shaped bracket for mounting in a mortise recess on the top edge of a door for fixed attachment to a top strap of a dihedral angle bracket including a door hinge leaf, said Z-shaped bracket having a first strap for face-to-face abutting relation with the strap of the dihedral angle bracket at the top of the door, means to secure the first strap of the Z-shaped bracket to the strap of the dihedral angle bracket, means to secure the Z-shaped bracket to the door and means to operatively attach a door control device to the Z-shaped bracket whereby a non-loosening permanent structure and door control can be provided.

11. The combination with a door hingedly mounted in a door frame with the door leaf of the one hinge including a dihedral angle bracket having a plate along the heel of the door and a strap along the top edge, a Z-shaped bracket mounted in a mortise recess on the top edge of a door and attached to the strap of the dihedral angle bracket by one strap of said Z-shaped bracket, means securing the Z-shaped bracket to the door, and means operatively attaching a door control device to the door frame and to the Z-shaped bracket thereby providing a non-loosening permanent door structure and door control combination.

12. A hinge structure comprising an unswaged butt hinge having an appreciable space between the jamb leaf and the door leaf when the butt leaves are in closed position, said space being sufficient to accommodate two thicknesses of dihedral angle brackets, two dihedral angle brackets, one dihedral angle bracket for the jamb leaf and one dihedral angle bracket for the door leaf, said one dihedral angle bracket having one leg adapted to be fixed to the face of the jamb leaf adjacent the door leaf when the hinge is closed, the other dihedral bracket having one leg adapted to be fixed to the face of the door leaf adjacent the jamb leaf when the hinge is closed, said hinge leaves and angle brackets having registering screw receiving holes whereby the angle brackets are additionally maintained in fixed relation to their respective leaves by the attaching screws.

13. The invention according to claim 3 in which the jamb angle bracket has screw receiving holes countersunk from the inside surfaces of its legs.

14. The invention according to claim 3 in which the door dihedral angle bracket is provided with screw receiving holes countersunk from the outer surfaces of its legs.

15. The invention according to claim 3 in which the said one leg of the jamb dihedral bracket is of greater length than the said one leg of the door dihedral angle bracket.

16. The invention according to claim 3 in which the jamb dihedral angle bracket is provided with screw receiving holes countersunk from their inner surfaces, and the door dihedral angle bracket is provided with screw receiving holes countersunk from their outer surfaces.

17. The invention according to claim 7 in which the screw receiving holes of the said door leaf, said jamb leaf, the said one leg of the jamb bracket, and the said one leg of the door bracket are arranged in parallel pattern whereby the angle brackets may be interchanged from hinge leaf to the other hinge leaf for changing the hinge structure for use on a door opening in the opposite direction.

18. Non-loosening hinge construction comprising a hinge having a jamb leaf and a door leaf pivotally connected together, a dihedral angle bracket having a hinge jamb plate of a size to be covered by the jamb leaf of the hinge and adapted to be received within a mortise of a hinge jamb, said bracket having a lintel strap adapted to lie in a communicating mortise in the lintel, means to secure the jamb leaf to said jamb plate, and means to secure the door leaf to a door, the hinge leaf being mounted on the surface of the jamb plate facing outwardly from the door jamb and a filler plate of the thickness of the jamb leaf positioned between the lintel end of the jamb leaf and the lintel strap of the dihedral angle for completely filling the mortise flush with the exposed surface of the door jamb.

19. A door and frame structure comprising a door and a frame having heel portion and hinge jamb respectively arranged in edge-to-edge relation with the door closed and hingedly connected together, a jamb dihedral angle bracket having a strap along the lintel, said dihedral angle bracket having a jamb plate extending from the dihedral angle of said strap, a jamb hinge seat portion on said jamb plate spaced from said strap, means securing the jamb hinge leaf to said jamb hinge seat in substantially flush relation to the surface of the jamb, a door dihedral angle bracket having a strap along the top edge of the door and a plate extending downwardly from said strap, a hinge seat on said door plate spaced from said door strap portion and means securing the door hinge leaf to said door hinge seat.

20. The invention according to claim 16 in which filler plates are provided between the straps and the hinge seat to fill the space flush with the exposed surface of the hinge leaves.

21. The invention according to claim 17 in which the plates extend beyond the hinge seats and additional filler plates are provided to maintain a flush relation between the exposed edge surfaces and the hinge leaves and filler plates.

22. A metal door and frame structure comprising a hollow metal door and a hollow metal frame having heel portion and hinge jamb arranged in edge-to-edge relation with the door closed and hingedly connected together, a jamb dihedral angle bracket having a strap along the inner surface of the skin of the lintel and secured thereto, said jamb dihedral angle bracket having a first plate portion extending from said strap, a hinge seat portion offset from said first jamb plate portion, said seat having a plurality of threaded machine screw receiving apertures therein, a second jamb plate portion lying in the plane of the first jamb portion with both plate portions engaging the inner surfaces of said skin of the hinge jamb and secured thereto, said skin extending to the edges of said hinge seat portion, a hinge leaf fixed in substantially flush abutting relation to said skin, a door dihedral angle bracket having a strap along the top edge of the door secured to the inner surface of the skin of the door, said door dihedral angle including a first plate portion extending from said strap, a hinge seat portion extending from said first plate portion of said door dihedral angle, and a second plate portion extending from said seat portion, both of said door dihedral angle plate portions being fixed to the skin of the heel of the door.

References Cited

UNITED STATES PATENTS 2,786,229   3/1957   Carroll _____ 16—128

MARVIN A. CHAMPION, *Primary Examiner.*

EDWARD C. ALLEN, *Examiner.*

D. L. TROUTMAN, *Assistant Examiner.*